United States Patent
Pursifull et al.

(10) Patent No.: US 11,293,372 B1
(45) Date of Patent: Apr. 5, 2022

(54) METHOD AND SYSTEM FOR ADJUSTING OPERATION OF A FUEL INJECTOR

(71) Applicant: Ford Global Technologies, LLC, Dearborn, MI (US)

(72) Inventors: Ross Pursifull, Dearborn, MI (US); Joseph Lyle Thomas, Farmington Hills, MI (US); Michael Uhrich, Wixom, MI (US); David Oshinsky, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/039,589

(22) Filed: Sep. 30, 2020

(51) Int. Cl.
*F02D 41/40* (2006.01)
*F02D 41/24* (2006.01)

(52) U.S. Cl.
CPC ....... *F02D 41/401* (2013.01); *F02D 41/2422* (2013.01); *F02D 41/2467* (2013.01); *F02D 2200/0602* (2013.01); *F02D 2200/10* (2013.01)

(58) Field of Classification Search
CPC ............... F02D 41/401; F02D 41/2467; F02D 41/2422; F02D 2200/0602; F02D 2200/10
See application file for complete search history.

(56) References Cited

U.S. PATENT DOCUMENTS

| | | | |
|---|---|---|---|
| 6,672,277 B2 | 6/2004 | Yasuoka et al. | |
| 7,640,916 B2 | 1/2010 | Ulrey et al. | |
| 7,717,088 B2 * | 5/2010 | Thomas | F02D 41/2438 123/478 |
| 7,938,101 B2 * | 5/2011 | Cinpinski | F02D 41/40 123/446 |
| 7,991,538 B2 | 8/2011 | Olbrich et al. | |
| 9,115,676 B2 | 8/2015 | de Boer et al. | |
| 9,334,824 B2 | 5/2016 | Pursifull et al. | |
| 10,094,319 B2 | 10/2018 | Ulrey et al. | |
| 10,731,593 B2 | 8/2020 | Sumilla et al. | |
| 10,844,804 B2 | 11/2020 | Pursifull et al. | |
| 2003/0121495 A1 | 7/2003 | Abo et al. | |
| 2011/0288738 A1 | 11/2011 | Donnelly et al. | |
| 2013/0213361 A1 | 8/2013 | Zeng et al. | |
| 2014/0074377 A1 * | 3/2014 | Petersen | F02D 41/2451 701/104 |
| 2015/0081195 A1 | 5/2015 | Berkemeier et al. | |
| 2015/0275809 A1 * | 10/2015 | Shibata | F02D 41/3005 701/104 |
| 2016/0153386 A1 | 6/2016 | Ranga et al. | |
| 2016/0153390 A1 | 6/2016 | Ranga et al. | |
| 2016/0153391 A1 | 6/2016 | Ranga et al. | |
| 2016/0363090 A1 * | 12/2016 | Russ | F02D 41/2432 |

(Continued)

FOREIGN PATENT DOCUMENTS

| | | |
|---|---|---|
| CN | 1227455 A | 9/1999 |
| EP | 0049704 A2 | 4/1982 |
| WO | 2012045850 A2 | 4/2012 |

*Primary Examiner* — Carl C Staubach
(74) *Attorney, Agent, or Firm* — Geoffrey Brumbaugh; McCoy Russell LLP

(57) ABSTRACT

Methods and systems for adjusting fuel injector operation according to fuel pressure and electrical fuel injector signals are described. In one example, the fuel injector transfer function values are adjusted in a way that may lower a burden on fuel injector adaptation. The methods and systems described herein may be suitable for direct and port fuel injectors.

18 Claims, 7 Drawing Sheets

(56) References Cited

U.S. PATENT DOCUMENTS

| | | | |
|---|---|---|---|
| 2016/0369765 A1* | 12/2016 | Pohlkamp | F02P 19/021 |
| 2018/0238260 A1 | 8/2018 | Seegmuller et al. | |
| 2019/0101077 A1* | 4/2019 | Blake | F02D 41/40 |
| 2020/0232411 A1 | 7/2020 | Pursifull et al. | |
| 2021/0040907 A1* | 2/2021 | Christensen | F02D 41/086 |

* cited by examiner

METHOD AND SYSTEM FOR ADJUSTING OPERATION OF A FUEL INJECTOR

FIELD

The present description relates generally to methods and systems for adjusting operation of fuel injectors that inject fuel to an internal combustion engine.

BACKGROUND/SUMMARY

An internal combustion engine may include one or more fuel injectors to inject fuel directly into a cylinder, or alternatively, into an intake port of a cylinder. The fuel injector may be commanded fully open and fully closed via an electric signal. The fuel injector may provide a fuel flow rate when it is fully open and the amount of fuel that is injected by the fuel injector may be controlled via adjusting pressure of fuel that is supplied to the fuel injector and timing of the electric signal. Due to manufacturing tolerances and operating conditions experienced by the fuel injector, an amount of fuel injected by one fuel injector for a given fuel injector command when the fuel injector is new may be a first amount. The amount of fuel that is injected by the fuel injector for the same given fuel injection command when the fuel injector is aged may be a second amount. In addition, an amount of fuel injected by a second fuel injector that is similar to the first fuel injector for the same given fuel injection command may be a third amount, the third amount different than the first amount. Therefore, it would be desirable to provide a way of adjusting operation of a fuel injector so that a fuel injection command delivers a more consistent amount of fuel injected.

In one example, the above issue may be addressed by a method for operating a fuel injector, comprising: commanding a fuel injector to open from a closed position via a controller; and adjusting one or more values stored in an indexing array that is applied to index a table or function stored in memory of the controller responsive to operation of the fuel injector, where the table or function stores a relationship that describes mass of fuel injected via the fuel injector as a function of fuel injector pulse width.

By adjusting one or more values stored in an indexing array that is applied to index a table or function stored in memory of the controller responsive to operation of the fuel injector, it may be possible to provide a technical result of relearning at least a portion of fuel injector operation. Specifically, pressure based fuel injector transfer function adjustments may be smaller than if a fuel injector transfer function is simply adjusted once for each fuel injector pulse width correction. Consequently, the burden to adapt fuel control parameters may be lessened.

The approach described herein may have several advantages. In particular, the approach may reduce an amount of time it takes to adapt a fuel injector transfer function or operational relationship. Further, the approach may be applicable to port and direct fuel injectors. In addition, the approach may be performed while a vehicle is operating on a road.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
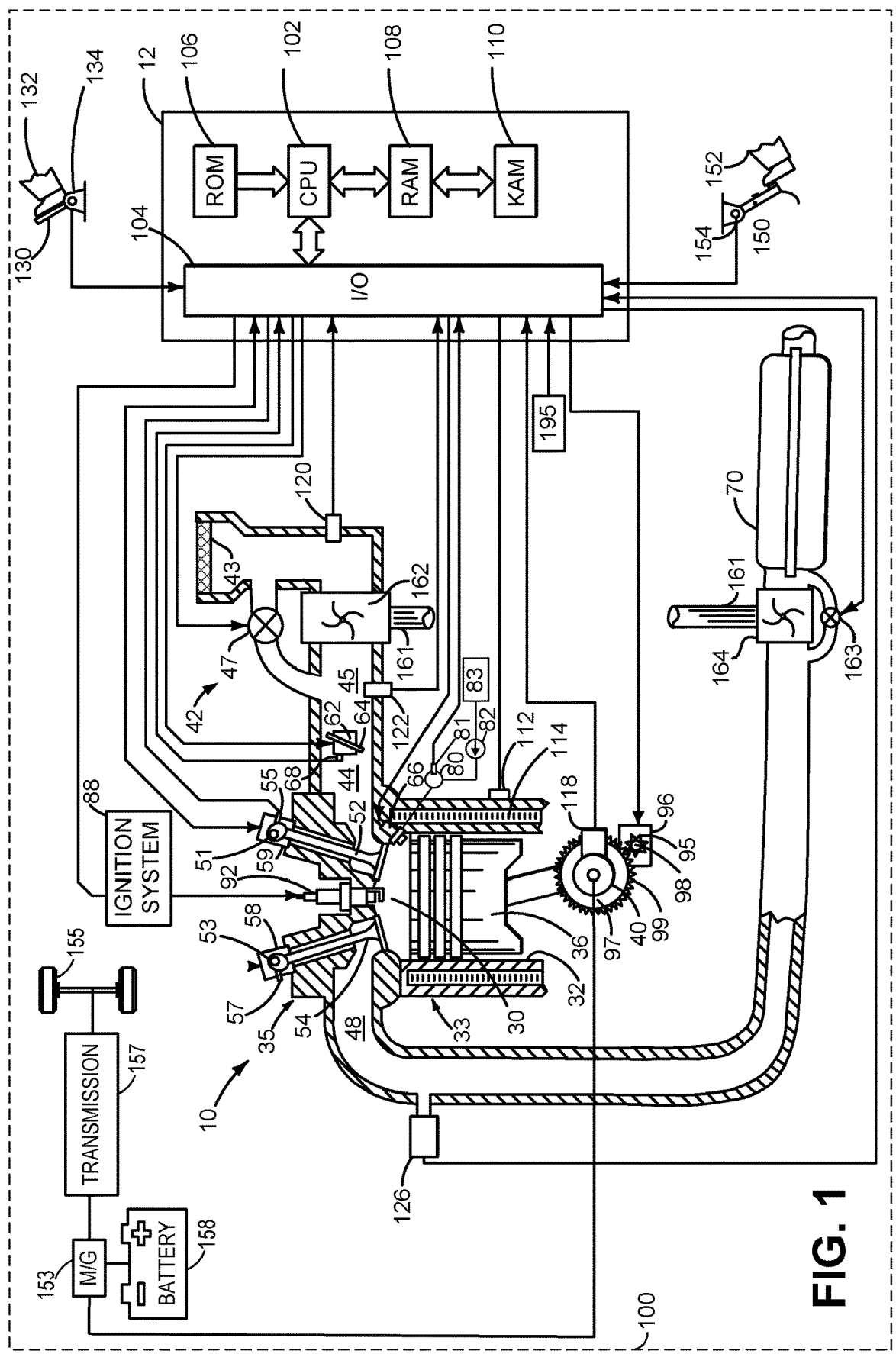
FIG. 1 is a schematic diagram of an engine system.
Figure 2:
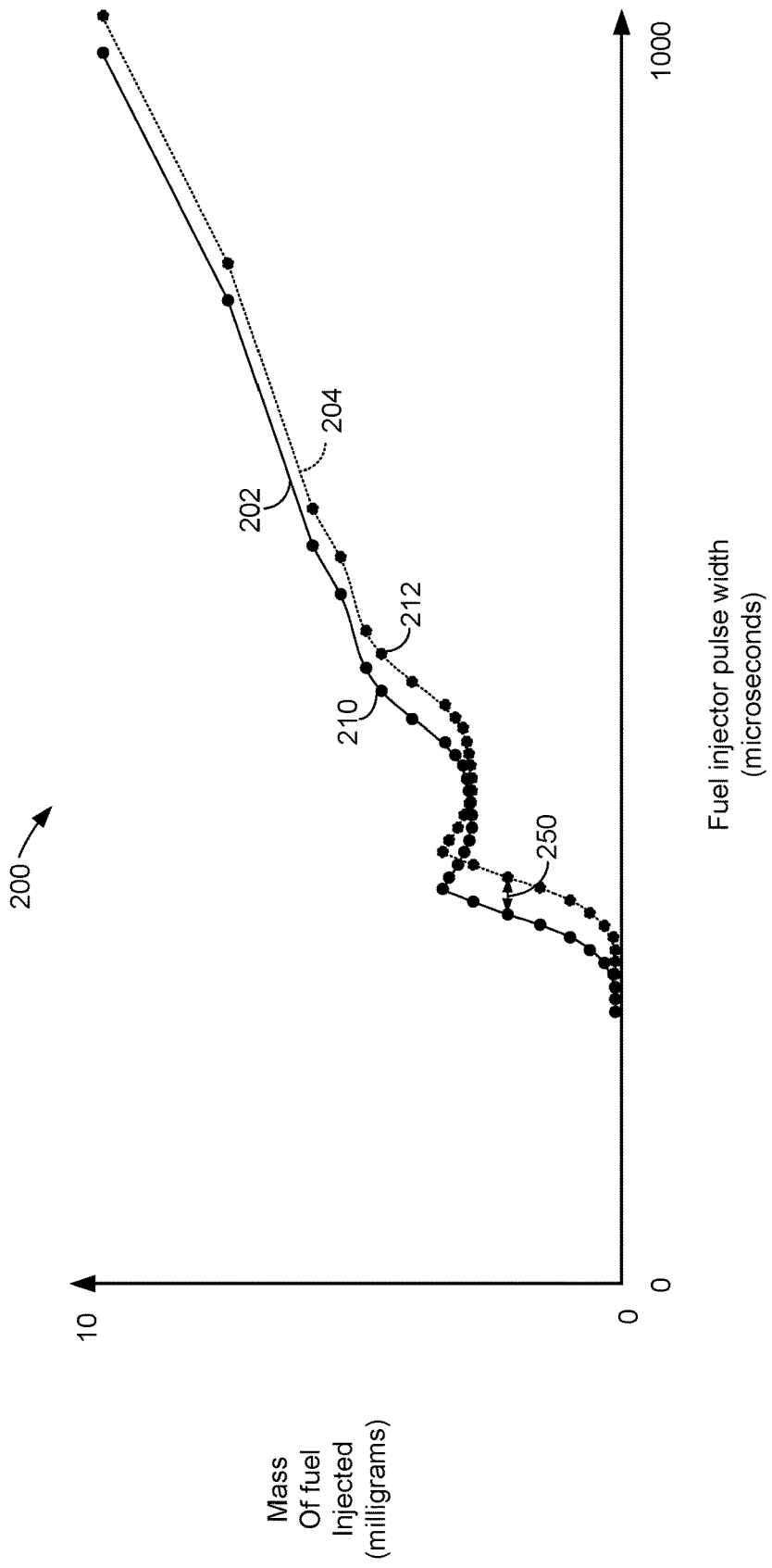
FIG. 2 shows an example plot of a prior art method for adjusting a fuel injector transfer function according to fuel injection timing.
Figure 3:
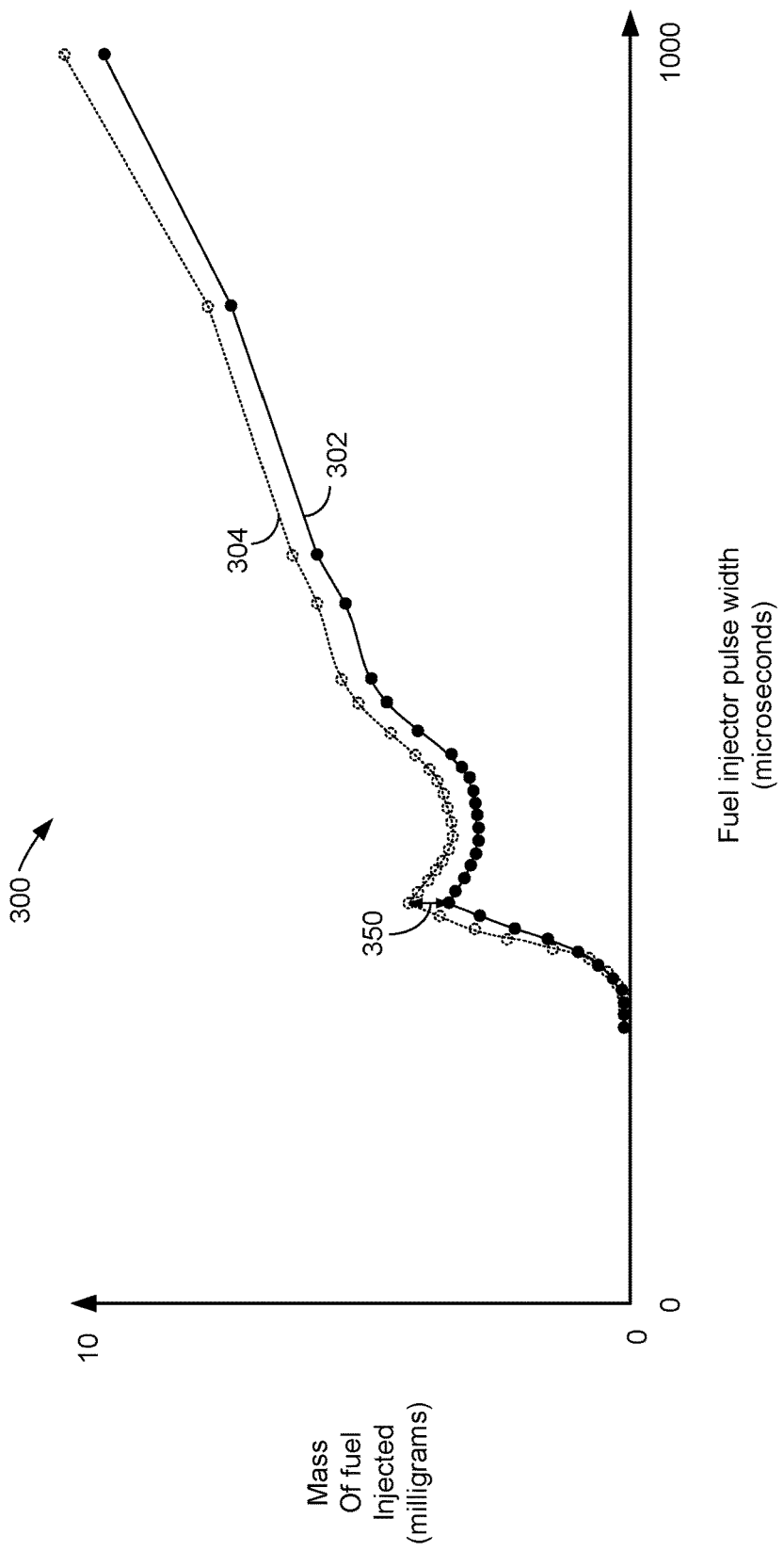
FIG. 3 shows an example plot of a prior art method for adjusting a fuel injector transfer function according to pressure based fuel injector compensation.
Figure 4:
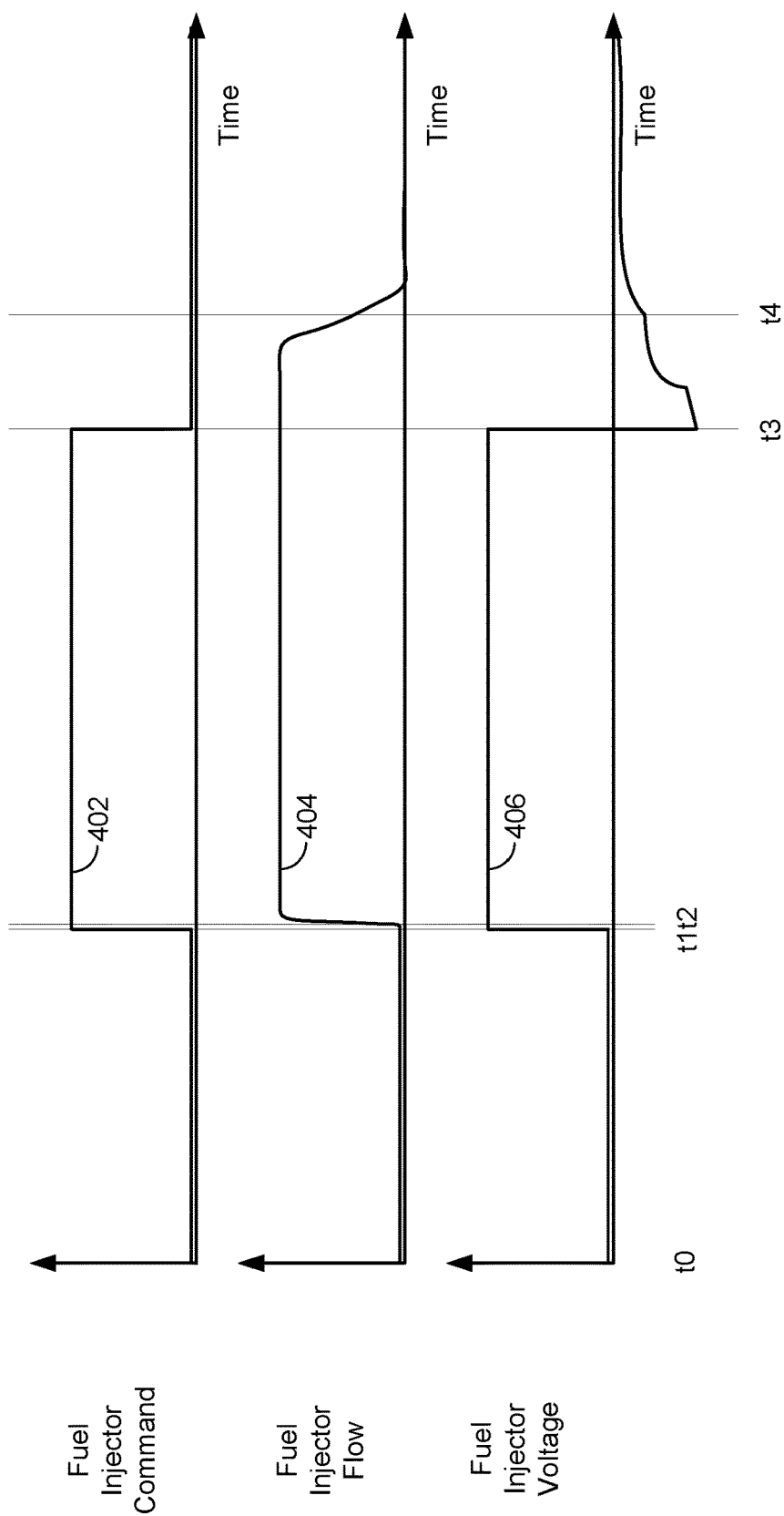
FIG. 4 shows example plots for a fuel injection event.
Figure 5:
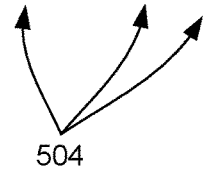
FIG. 5 shows example horizontal axis index values for a fuel injector transfer function.
Figure 6:
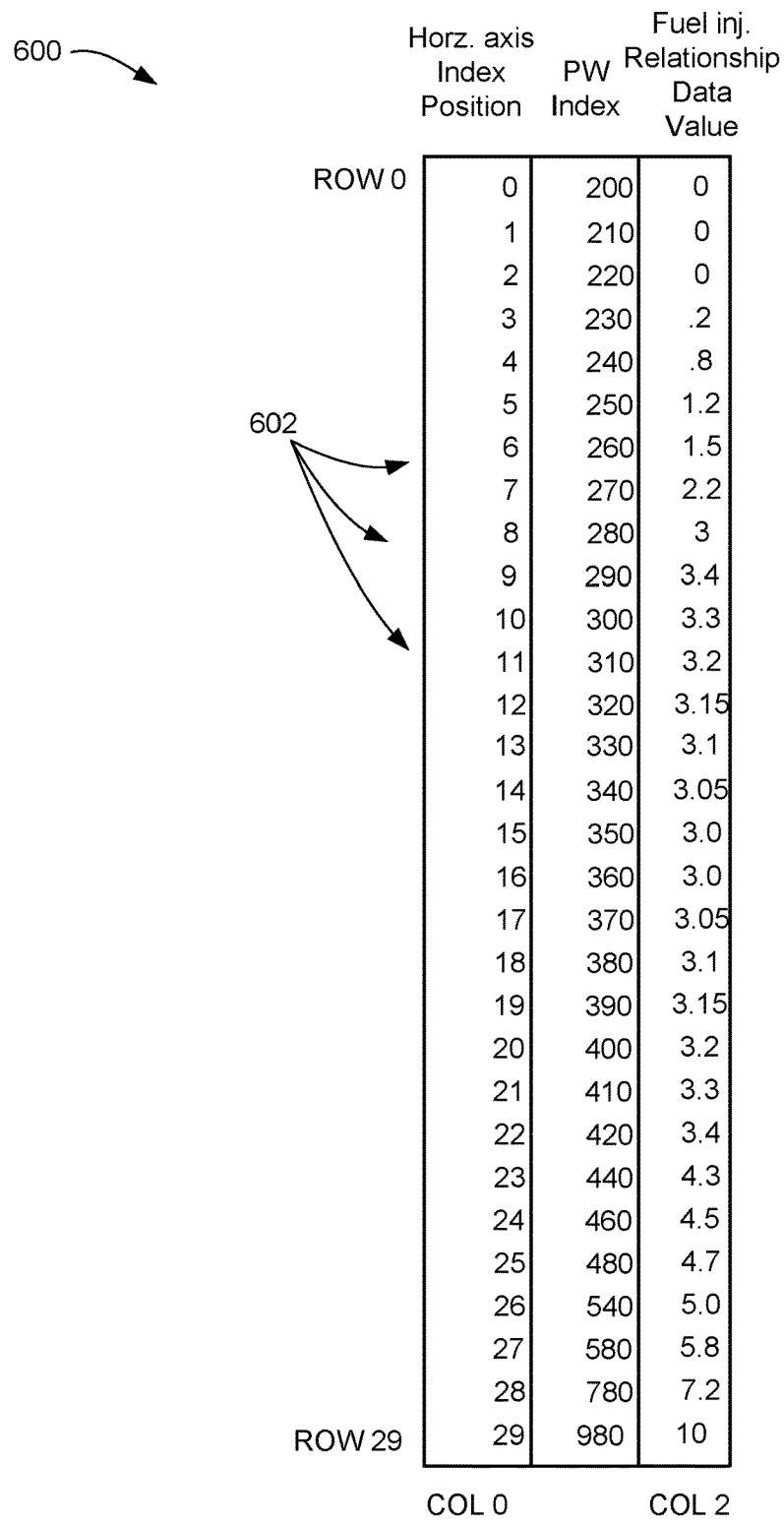
FIG. 6 shows example adjusted horizontal axis index values according to the method of FIG. 7.
Figure 7:
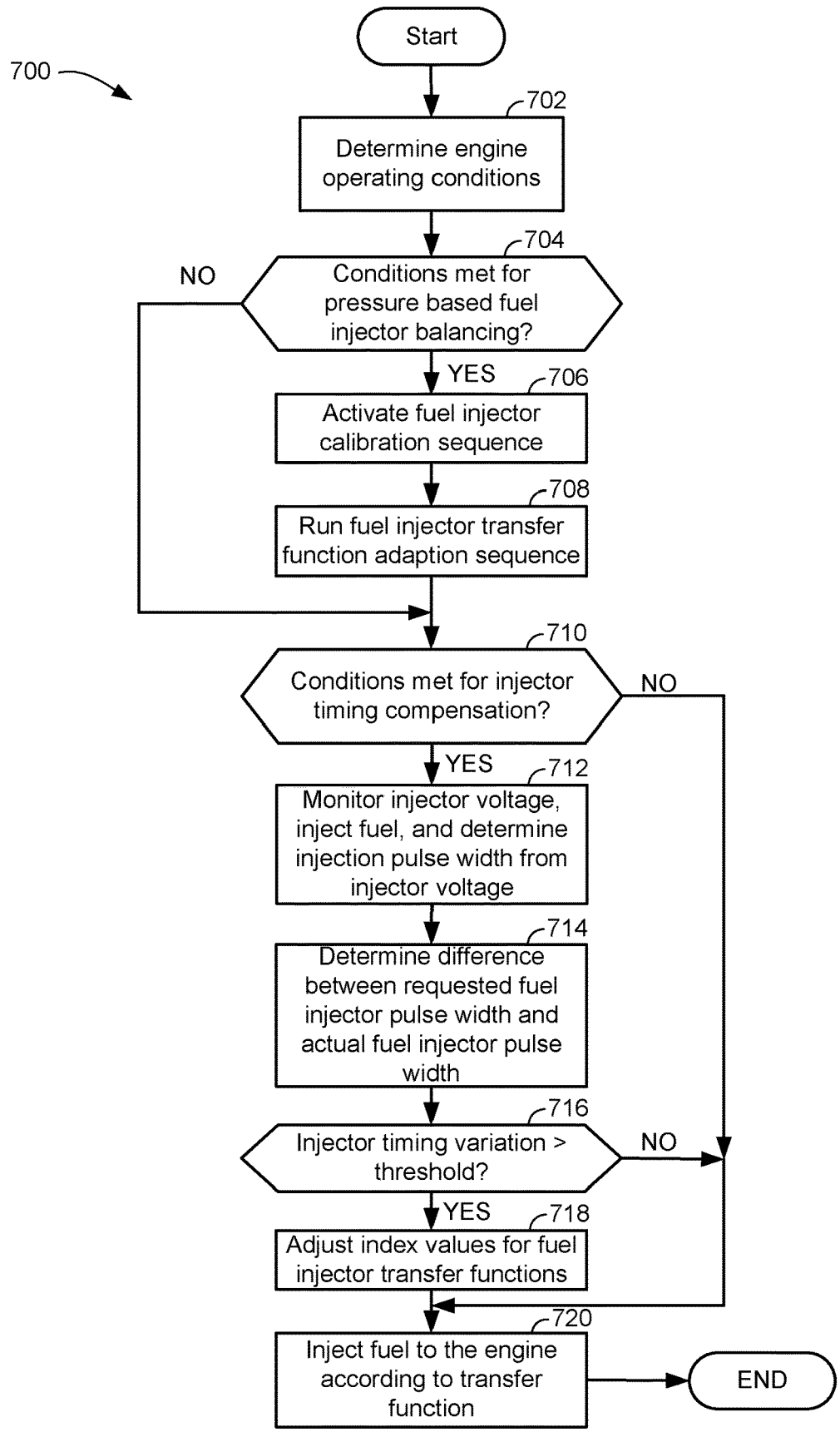
FIG. 7 shows a high level flowchart of an example method adjusting a fuel injector transfer function.

The following description relates to systems and methods for adapting a relationship or transfer function of a fuel injector. The relationship describes fuel injector operation according to fuel injector pulse width and mass of fuel injected by the fuel injector. The vehicle may be a hybrid vehicle as shown in FIG. 1. Alternatively, the vehicle may include only an internal combustion engine as a propulsion source. FIGS. 2 and 3 show prior art methods for adjusting a relationship that describes operation of a fuel injector. Signals of interest for a single fuel injection event are shown in FIG. 4. FIGS. 5 and 6 show example fuel injector indexes and relationships. FIG. 7 is a flow chart of a method for adjusting operation of a fuel injector.

Referring to FIG. 1, an internal combustion engine 10 is shown. Engine 10 may be included in a drivetrain of a vehicle 100 configured for on-road propulsion. In one example, vehicle 100 is a hybrid electric vehicle. However, vehicle 100 may be a conventional vehicle that includes only an internal combustion engine as a source of propulsive effort.

Engine 10 comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. An optional starter 96 (e.g., low voltage (operated with less than 30 volts) electric machine) is included for cranking the engine during an engine start. The starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain to initiate engine rotation during an engine start. Once a threshold engine speed is reached, the starter may be decoupled from the engine and thereafter engine rotation is maintained via fuel combustion in engine cylinders. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system including a fuel tank 83, fuel pump 82, and fuel rail 80. Pressure in fuel rail 80 may be determined via pressure sensor 81. In one example, a high pressure, dual stage, fuel system may be used to generate higher fuel pressures. In further embodiments, fuel may be delivered into an intake port of cylinder 30, upstream of intake valve 52, to provide port injection of fuel. In still further embodiments, a portion of cylinder fuel may be delivered via direct injection while a remaining portion is delivered via port injection. The different injectors may deliver the same fuel or fuel of different properties, such as a gasoline fuel and an ethanol fuel.

Intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve (CRV) 47 may be selectively adjusted to a plurality of positions between fully open and fully closed. Adjusting the opening of CRV 47 allows boosted intake air to be selectively recirculated to upstream of the compressor so as to decrease the pressure in boost chamber 45. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an propulsive effort pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. The propulsive effort pedal and brake pedal may be combined for example in a pivoting setup to select either increasing vehicle speed or decreasing vehicle speed. Further, the propulsive effort pedal may be combined with the transmission direction selection for example, joystick control. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

The controller 12 receives signals from the various sensors of FIG. 1 and employs the various actuators of FIG. 1, such as throttle 62, fuel injector 66, spark plug 91, etc., to adjust engine operation based on the received signals and instructions stored on a memory of the controller. As one example, the controller may send a pulse width signal to the fuel injector to adjust an amount of fuel delivered to a cylinder. Further, controller 12 may receive input from a human operator or vehicle passenger via human/machine interface 195. Human/machine interface may be a touch screen, touch panel, key switch, or other known input device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

In some examples, vehicle 100 may be a hybrid vehicle with multiple sources of torque available to one or more vehicle wheels 155. In other examples, vehicle 100 is a conventional vehicle with only an internal combustion engine, or an electric vehicle with only electric machine(s). In the example shown, vehicle 100 includes engine 10 and an electric machine 153. Electric machine 153 may be a motor or a motor/generator. Crankshaft 40 of engine 10 and electric machine 153 are connected via a transmission 157 to vehicle wheels 155. In the depicted example, a first clutch 156 is provided between crankshaft 40 and electric machine 153. Electric machine 153 is shown directly coupled to transmission 157. Controller 12 may send a signal to an actuator of each clutch 156 to engage or disengage the clutch, so as to connect or disconnect crankshaft 40 from electric machine 153 and the components connected thereto, and/or connect or disconnect electric machine 153 from transmission 157 and the components connected thereto. In other examples, clutches need not be included. Transmission 157 may be a gearbox, a planetary gear system, or another type of transmission. The powertrain may be configured in various manners including as a parallel, a series, or a series-parallel hybrid vehicle.

Electric machine 153 receives electrical power from a traction battery 158 to provide torque to vehicle wheels 155. Electric machine 153 may also be operated as a generator to provide electrical power to charge battery 158, for example during a braking operation.

Thus, the system of FIGS. 1 and 2 provides for a vehicle system, comprising: an engine including a fuel injector; and a controller with computer readable instructions stored on non-transitory memory that when executed cause the controller to: adjust one or more values stored in an indexing array that is applied to index a table or function stored in controller memory responsive to an opening time of the fuel injector, where the table or function stores a relationship that describes mass of fuel injected via the fuel injector as a function of fuel injector pulse width, and injecting fuel to the engine via the fuel injector responsive to the adjusted one or more values. The system further comprises additional instructions to open the fuel injector and monitor the opening time of the fuel injector. The system further comprises additional instructions to deactivate a fuel injector pump and inject fuel to the engine while the fuel injection pump is deactivated. The system further comprises additional instructions to adjust one or more values in the table or function that stores the relationship that describes mass of fuel injected via the fuel injector as a function of fuel injector pulse width. The system includes where the fuel injector pump is deactivated while engine load is less than a threshold engine load. The system further comprises additional instructions that when executed by the controller cause the controller to: adjust values in the table or function that stores the relationship that describes mass of fuel injected via the fuel injector in response to pressure based fuel injector balancing. The system includes where the pressure based fuel injection estimates an amount of fuel injected via a fuel injector based on a drop in pressure of fuel in a fuel rail.

Referring now to FIG. 2, a plot that graphically shows how a first prior art method for adjusting operation of a relationship between fuel injector pulse width and mass of fuel injected by a fuel injector (e.g., a fuel injector transfer function) operates. Plot 200 includes a first relationship that is represented by curve 202 that describes baseline operation of a fuel injector (e.g., a relationship that has not been adapted). Plot 200 includes a second relationship that is represented by curve 204 that is a time shifted version of first relationship 202. The vertical axis represents mass of fuel injected. The horizontal axis represents fuel injector pulse width.

The first prior art method for adjusting a relationship between fuel injector pulse width and mass of fuel injected may shift a relationship between fuel injector pulse width and mass of fuel injected by a fuel injector with respect to fuel injector pulse width time as indicated by arrow 250. For example, if first relationship 202 is a baseline or relationship that has not been adjusted to compensate for fuel injector timing, its values may be moved twenty microseconds to the right to generate second relationship 204 when the observed fuel injector opening time exceeds the nominal fuel injector opening time by twenty microseconds for a given mass of fuel to be injected. The timing of one example fuel injection even is shown in FIG. 4. The prior art method may move each value or data point that is used to generate first relationship 202 twenty microseconds to generate second relationship 204. Thus, data point 210 in first relationship 202 becomes data point 212 in second relationship 204 when a fuel injector is open twenty micro seconds longer than commanded to provide a given mass of fuel injected.

Referring now to FIG. 3, a plot that graphically shows how a second prior art method for adjusting operation of a relationship between fuel injector pulse width and mass of fuel injected by a fuel injector (e.g., a fuel injector transfer function) operates. Plot 300 includes a first relationship that is represented by curve 302 that describes base operation of a fuel injector (e.g., a relationship that has not been adapted). Plot 300 includes a second relationship that is represented by curve 304 that is a pressure based adapted relationship between fuel injector pulse width and mass of fuel injected. The vertical axis represents mass of fuel injected. The horizontal axis represents fuel injector pulse width.

The second prior art method for adjusting a relationship between fuel injector pulse width and mass of fuel injected may increase or decrease mass of fuel injected values in the relationship according to fuel mass estimates that are based on pressure drops in fuel rail pressure. A mass of fuel that is injected for a particular fuel injector pulse width for a relationship between fuel injector pulse width and mass of fuel injected may increase or decrease as indicated by arrow 350. For example, if first relationship 302 is a baseline or relationship that has not been adjusted to compensate for fuel injector timing, its values may be adapted to generate second relationship 304 according to pressure based estimates of fuel amounts injected and prescribed fuel injector pulse widths. The pressure based fuel injector compensation is described in further detail in the description of method 700. While an offset error is shown, an offset and gain error may be more typical.

Turning now to FIG. 4, signals of interest for an example fuel injection event are shown. The signals may provide insight to determine a length or duration of a fuel injection event (e.g., where a fuel injector opens to inject fuel from a closed position and then closes to end the fuel injection event).

The first plot from the top of FIG. 4 is a plot of a fuel injector command signal (e.g., a transistor-transistor logic (TTL) level signal for activating (e.g., opening) and deactivating (e.g., closing) a fuel injector) versus time. The vertical axis represents TTL signal level and the fuel injector is commanded open or activated when trace 402 is at a level that is near the vertical axis arrow. The fuel injector is commanded closed or deactivated when trace 402 is at a level that is near the horizontal axis. The horizontal axis represents time and time increases from the left side of the figure to the right side of the figure. Trace 402 represents the fuel injector command state.

The second plot from the top of FIG. 4 is a plot of fuel injector fuel flow versus time. The vertical axis represents the fuel injector flow rate and the fuel injector flow rate increases in the direction of the vertical axis arrow. The fuel injector flow rate is zero when trace 404 is near the horizontal axis. The horizontal axis represents time and time increases from the left side of the figure to the right side of the figure. Trace 404 represents the fuel injector flow rate.

The third plot from the top of FIG. 4 is a plot of fuel injector voltage (e.g., voltage at the fuel injector) versus time. The vertical axis represents the fuel injector voltage and the fuel injector voltage increases in the direction of the vertical axis arrow. The fuel injector voltage is zero when trace 406 is near the horizontal axis. The horizontal axis represents time and time increases from the left side of the figure to the right side of the figure. Trace 406 represents the fuel injector voltage. The fuel injector voltage may be determined at a driver transistor within a controller and it does not necessary need to be measured precisely at the fuel injector.

At time t0, the fuel injector is commanded off and the fuel injector flow rate is zero. The fuel injector voltage is zero. The fuel injector is not injecting fuel to the engine during these conditions.

At time t1, the fuel injector is commanded open or on. The fuel injector flow rate is zero at the time that the fuel injector is commanded on. The fuel injector voltage is increased when the fuel injector is commanded on.

At time t2, the fuel injector begins to flow fuel as it opens. The time between time t1 and time t2 may be referred to as an injector opening time delay. The opening time delay may be measured at a time of vehicle manufacture and stored in controller memory. The fuel injector remains commanded on and the fuel injector voltage remains at a higher level.

At time t3, the fuel injector is commanded off. However, fuel continues to flow through the fuel injector while the fuel injector's magnetic field begins to be reduced. The fuel injector voltage turns negative due to the sudden cut-off of electric current flow into the fuel injector.

At time t4, the magnitude of the slope of the fuel injector voltage increases as the fuel injector voltage decays toward zero. This change in slope may be the basis for determining the fuel injector closing time since the voltage reduction may be indicative of the fuel injector's magnetic field collapsing, which may be indicative of closing time of the fuel injector. The fuel injector off delay may be an amount of time between time t3 and time t4. The fuel injector opening time or on time may be estimated as the amount of time between time t2 and time t4 or time t4 minus time t2. The fuel injector pulse width (e.g., the amount of time that the fuel injector is injecting fuel) may be estimated as time t4 minus time t2.

Referring now to FIG. 5, values for representing a baseline relationship (e.g., a relationship that has not been adapted for engine operating conditions) between fuel injector pulse width and injected fuel mass is shown. In addition, arrays for referencing or indexing the relationship are shown. The relationship may be of the type shown in FIGS. 2 and 3.

Table 500 includes arrays for the describing the relationship between fuel injector pulse width and injected fuel mass. The arrays are located in rows 502 and columns 504. In this example, row 0 and row 29 are indicated along with column 0 and column 2. The other rows and column numbers follow the same numbering convention. Each row/column pair represents one memory cell or location in controller memory. The memory may be random access memory, keep alive memory, or electrically erasable memory. Thus, the memory at row 0 column 0 holds a data value of zero. The memory at row 29 column 2 holds a value of 10.

Data in column 0 represents an array of horizontal axis index positions into the memory locations that hold values for the relationship between fuel injector pulse width and mass of fuel injected. Data in column 1 represents an array of fuel injector fuel pulse width values that are associated with the horizontal axis index positions shown in column 0. Data in column 2 represents an array of values in the relationship between fuel injector pulse widths and mass of fuel injected. Data in column 2 may be indexed or referenced based on data in column 1. For example, to determine an amount of fuel that will be injected via a fuel injector with a pulse width of 480 microseconds, which corresponds to data point 210 shown in FIG. 2, table 500 may be referenced by the fuel pulse width (480 microseconds) via the fuel injector pulse width index (column 1). The fuel pulse width index value of 480 microseconds corresponds to horizontal axis index position 24 in the horizontal axis index array (column 1). The data value in the relationship between fuel injector pulse width and amount of fuel injected (column 4) corresponding to the horizontal axis index position 24 is 4.5 milligrams.

Values in the fuel injector relationship array may be adjusted when fuel pressure based fuel injector compensation is initiated. In addition, the prior art methods for compensating for fuel injector timing may adjust values in the fuel injector relationship array (column 2). Consequently, if fuel pressure based fuel injector compensation were performed followed by fuel injector timing compensation, it might be necessary to readjust values in the fuel injector relationship array because a shift in values in the fuel injector relationship array may make it necessary to change which data entry in the fuel injector relationship array is adjusted at present vehicle operating conditions.

Referring now to FIG. 6, similar to FIG. 5, values for representing a relationship between fuel injector pulse width and injected fuel mass is shown. In addition, the arrays for referencing or indexing the relationship are shown. The relationship and its indexing arrays shown in FIG. 6 are similar to those shown in FIG. 5, except the array of fuel pulse width values has been adapted according to the method of FIG. 7.

Table 600 includes arrays for the describing the relationship between fuel injector pulse width and injected fuel mass. The arrays are located in rows 602 and columns 604. In this example, row 0 and row 29 are indicated along with column 0 and column 2. The other rows and column numbers follow the same numbering convention. Each row/column pair represents one memory cell or location in controller memory.

Data in column 0 represents an array of horizontal axis index positions into the memory locations that hold values for the relationship between fuel injector pulse width and mass of fuel injected. Data in column 1 represents an array of fuel pulse width values that are associated with the horizontal axis index positions shown in column 0. Data in column 2 represents an array of values in the relationship between fuel injector pulse widths and mass of fuel injected.

Values in the fuel injector relationship array may be adjusted when fuel pressure based fuel injector compensation is initiated. In addition, the method of FIG. 7 may adjust values in the fuel injector pulse width array (column 1) in response to fuel injector timing compensation. This may allow fuel pressure based fuel injector compensation to be performed followed by fuel injector timing compensation. Adjusting the fuel injector pulse width index values may not cause the pressure based fuel injector compensation to readapt values in the fuel injector relationship data array. Therefore, adaptive effort to change values in the fuel injector relationship data array may be reduced.

The values in the fuel injector pulse width array (column 1) have been adjusted as compared to values shown in FIG. 5 in response to fuel injector pulse width timing being 20 microseconds shorter than a commanded or expected fuel injector pulse width. Thus, the value at row 0, column 1 is 200 microseconds whereas in FIG. 5 at row 0, column 1, the value was previously 220 microseconds. Similarly, other values in the fuel injector pulse width array have been adjusted to compensate for the 20 microseconds that has been determined. By updating values in the pulse width array index instead of values in the fuel injector relationship data array, it may be possible for pressure based fuel injector compensation to avoid or make smaller adjustments to data values in the fuel injector relationship data array. Consequently, an amount time and effort to adapt values in a fuel injector relationship data array may be reduced.

Referring now to FIG. 7, a high level flow chart of an example method 700 for adjusting a fuel injector transfer function or relationship is shown. The method of FIG. 7 may be incorporated into the system of FIG. 1 as executable instructions stored in controller non-transitory memory. In addition, other portions of method 700 may be performed via a controller transforming operating states of devices and actuators in the physical world. The controller may employ engine actuators of the engine system to adjust engine operation.

At 702, method 700 determines operating conditions. The engine and vehicle operating conditions may be determined via the sensors and actuators described herein. In one example, the operating conditions may include but are not limited to ambient temperature, ambient pressure, engine temperature, engine speed, vehicle speed, fuel rail pressure, and propulsive effort pedal position. Method 700 proceeds to 704.

At 704, method 700 judges if conditions are present for performing pressure based fuel injector balancing. In one example, pressure based fuel injector balancing may be performed during conditions where engine temperature is greater than a threshold temperature and driver demand torque or power is less than a threshold. If method 700 judges that conditions are present to perform pressure based fuel injector balancing, the answer is yes and method 700 proceeds to 706. Otherwise, the answer is no and method 700 proceeds to 710.

At 706, method 700 begins to perform pressure based fuel injector balancing. Pressure based fuel injector balancing may be performed according to the method described in U.S. Pat. No. 7,717,088 which is hereby fully incorporated by reference.

The controller runs a calibration injection sequence for a predetermined K number of times (e.g., 3 times). The routine may also predetermine the order in which injectors are to be activated in the calibration injection sequence. It may determine when and how many times each injector may be activated (e.g., opened from a closed position) during a calibration injection sequence. It may further include a counting mechanism to keep track of the activation of injectors and make sure injection is cycled through all injectors before proceeding to the next calibration injection sequence. For example for a 4-cylinder engines with 4 injectors, the routine may predetermine that calibration will proceed in the following sequences for a calibration injection sequence: injector #1, #2 #3, #4 and the calibration injection sequence may be repeated 3 times in a fuel injector calibration routine. The routine may also determine that the Fuel Injector Calibration Routine may be repeated after a predetermined amount of time has elapsed (e.g., 10 min) after the conclusion of the last Fuel Injector Calibration Routine.

The control unit runs a fuel injector transfer function adaption routine for each injector. For example, if the engine is a four cylinder engine and each engine has one injector, the fuel injector transfer function adaption routine may be run four times, one for each injector.

The controller 12 requests the high pressure fuel supply pump (e.g., 82) to issue extra pump strokes, increase pump stroke frequency, and/or increase a pump stroke for at least one stroke so that the fuel pressure in the high pressure fuel rail (e.g., 80) reaches a predetermined target calibration pressure ($P_m$).

The controller 12 turns off the high pressure fuel supply pump 82 so that no more fuel will be further supplied to the high pressure fuel rail 80 via fuel pump 82.

The control unit runs a series of fuel injections in a predetermined sequence (e.g., injector #1, injector #2, injector #3, injector #4, or in a firing order as prescribed for the engine) and repeat the sequence for a predetermined L number of times (e.g., 3 engine cycles, where each injector operates at least once during each engine cycle) while monitoring the fuel pressure (P) profile as a function of time or injection events in the high pressure fuel reserve. Each of the fuel injections may be commanded to provide predetermined fuel injector pulse widths. The injection series may be schedules so that at the end of the injections, P reaches or falls below a normal operating target pressure ($P_n$), where $P_n$ is a desired target fuel pressure for the high pressure fuel reserve during normal fuel injection events. In some examples, the routine may monitor the fuel pressure in the high pressure fuel rail 80. The routine may also return the fuel pressure in the high pressure fuel rail back to a normal operating target pressure ($P_n$) before the start of the next calibration injection sequence, based on operating conditions, which may include engine operating conditions.

The controller 12 calculates fuel pressure drop ($\Delta P_{ij}$) due to each injection by the $i^{th}$ injector (e.g., j=1, 2, 3 ... 9 if each injector is injected 3 times during a calibration injection cycle and the calibration injection cycle is run 3 times during a calibration event). $\Delta P_{ij}$ corresponds to pressure drop in the high pressure fuel reserved due to injection by $i^{th}$ injector during the $j^{th}$ injection. Various engine operating conditions or events may affect fuel rail pressure measurements and may be taken into consideration when calculating the fuel pressure drop ($\Delta P_{ij}$) attributed to each injection. Therefore, in some examples, the routine may correlate fuel pressure to various engine operating conditions sensed via various sensors.

The controller 12 calculates an amount of fuel actually injected in each injection $Q_{ij}$, using the following equation, $$Q_{ij} = \Delta P^{ij}/C$$

where C is a predetermined constant coefficient for converting the amount of fuel pressure drop to the amount of fuel injected.

The control unit also determines the average amount of fuel actually injected by injector i ($Q_i$) using the following equation, $$Q_i = (\Sigma_i{}^j Q_{ij})/j$$

where j is number of injections by injector i (e.g., j=1, 2, 3 . . . 9 if each injector is injected 3 times during a calibration injection cycle and the calibration injection cycle is run 3 times during a calibration event). Method 700 proceeds to 708.

At 708, the controller 12 runs a fuel injector transfer function adaption sequence. The controller revises values in a relationship between fuel injector pulse widths and mass of fuel injected, which may be a basis for injecting fuel to the engine. In one example, method 700 updates a value in a memory location via indexing or referencing the relationship between fuel injector pulse widths and mass of fuel injected according to the commanded fuel pulse width. The value in the relationship corresponding to the fuel injector pulse width that was commanded during the predetermined fuel injection sequence may be revised with the value $Q_i$. For example, if the value $Q_i$ is 3.5 and the fuel injector injected fuel according to the relationship between fuel injector pulse width and mass of fuel injected shown in FIG. 5, and the commanded fuel injection pulse width was 430 microseconds. The fuel injector value of 3.3 located at index position 21 is updated to a value of 3.5. In this way, the relationship between fuel injector pulse width and mass of fuel injected may be updated or adapted to improve accuracy of the amount of fuel that is injected to the engine via the fuel injector. Method 700 proceeds to 710.

At 710, method 700 judges whether or not conditions are met for fuel injector timing compensation. In one example, fuel injector timing compensation may be provided when engine temperature is greater than a threshold temperature. If method 700 judges that conditions are met for fuel injector timing compensation, the answer is yes and method 700 proceeds to 712. Otherwise, the answer is no and method 700 proceeds to 720.

At 712, method 700 activates each fuel injector and commands each fuel injector to provide a predetermined fuel pulse width. Method 700 monitors voltage of each fuel injector and calculates an actual fuel injection pulse width for each cylinder based on the voltages of the respective fuel injectors. In one example, method 700 determines the fuel injection pulse widths for each cylinders as described and shown in FIG. 4. For example, the fuel injector pulse width starting time may be a time that the fuel injector is commanded activated plus a predetermined fuel injector delay time (e.g., time t2 in FIG. 4). The fuel injector closing time may be a time when the fuel injector voltage slope changes in a prescribed way or falls below a threshold level (e.g., time t4 shown in FIG. 4). The actual fuel injection pulse width may be the amount of time between the starting time and the closing time. Method 700 proceeds to 714.

At 714, method 700 determines a difference between the commanded fuel injection pulse width and the actual fuel injection pulse width. For example, if the commanded fuel injector fuel pulse width is 400 microseconds and the actual fuel injector fuel pulse width is 380 microseconds, the difference is 380−400=−20 microseconds. Method 700 proceeds to 716.

At 716, method 700 judges if the difference between the command fuel injection pulse width and the actual fuel injection pulse width is greater than a threshold amount. If so, the answer is yes and method 700 proceeds to 718. Otherwise, the answer is no and method 700 proceeds to 720.

At 718, method 700 adjusts values in an array that is applied to index or reference a fuel injector relationship between fuel injector pulse widths and amounts of fuel injected via the fuel injector. Each of the values in the array that are applied to index or reference the fuel injector relationship may be adjusted according to the difference value that was determined at 716. For example, if the baseline array for indexing the relationship between fuel injector pulse width and mass of fuel injected by the fuel injector is as shown in FIG. 5, then the fuel injector fuel pulse widths values in the fuel injector fuel pulse width indexing array are adjusted as shown in FIG. 6. Method 700 proceeds to 720.

At 720, method 700 injects fuel to the engine's cylinders according to one or more fuel injector transfer functions. For example, method 700 may command a 600 microsecond fuel injection pulse width to inject 6 milligrams of fuel to an engine cylinder. The 600 microsecond fuel injection pulse width may be determined from a fuel injector transfer function as shown in FIG. 2. Method 700 proceeds to exit.

Thus, method 700 may adjust values in a fuel injector pulse width indexing array so that effort of a pressure based fuel injector balancing routine may be reduced. In particular, by adjusting values in the fuel injector pulse width indexing array, it may be possible that a pressure based fuel injector balancing routine does not have to be executed upon completion of a fuel injector timing adaption sequence.

In this way, the method of FIG. 7 provides for a method for operating a fuel injector, comprising: commanding a fuel injector to open from a closed position via a controller; and adjusting one or more values stored in an indexing array that is applied to index a table or function stored in memory of the controller responsive to operation of the fuel injector, where the table or function stores a relationship that describes mass of fuel injected via the fuel injector as a function of fuel injector pulse width. The method includes where the controller adjusts the values. The method further comprises injecting fuel to an engine via a fuel injector and the controller responsive to the adjusted values.

In some examples, the method further comprises determining an amount of time the fuel injector is open. The method includes where the amount of time the fuel injector is open is based on a voltage of the fuel injector. The method includes where the one or more values are adjusted in response to the amount of time the fuel injector is open. The method includes where the values stored in the indexing array represent fuel injector pulse widths.

The method of FIG. 7 also provides for a method for operating a fuel injector, comprising: performing a pressure based fuel injector balancing procedure and adjusting values in a table or function that stores a relationship that describes mass of fuel injected via a fuel injector as a function of fuel injector pulse width in controller memory; commanding the fuel injector to open from a closed position after performing the pressure based fuel injector balancing procedure via a controller; and adjusting one or more values stored in an indexing array that is applied to index the table or the function responsive to operation of the fuel injector after performing the first pressure based fuel injector balancing procedure. The method includes where the indexing array holds fuel pulse width values. The method includes where the pressure based fuel injector balancing procedure includes deactivating a fuel pump. The method includes where the pressure based fuel injector balancing procedure includes injecting fuel to a cylinder. The method includes where the pressure based fuel injector balancing procedure includes estimating an amount of fuel injected via a pressure drop in a fuel rail. The method further comprises determining an amount of time the fuel injector is open after performing the pressure based fuel injector balancing procedure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a fuel injector, comprising:
commanding a fuel injector to open from a closed position via a controller with a commanded fuel injection pulse width;
responsive to the commanded fuel injection pulse width, operating the fuel injector with an actual fuel injection pulse width;
adjusting one or more fuel injector pulse width values stored in an indexing array based on the operation of the fuel injector to index a table or function without adjusting a fuel injector relationship data array, where the fuel injector relationship data array is based on a pressure based fuel injector balancing procedure,
where indexing the table or function includes applying the indexing array with the one or more adjusted fuel injector pulse width values to the table or function stored in memory of the controller responsive to the operation of the fuel injector, and where the table or function stores a relationship of a mass of fuel injected via the fuel injector as a function of fuel injector pulse width.

2. The method of claim 1, where the controller adjusts the one or more fuel injector pulse width values.

3. The method of claim 1, further comprising injecting fuel to an engine via the fuel injector and the controller responsive to the one or more adjusted fuel injector pulse width values.

4. The method of claim 1, further comprising determining an amount of time the fuel injector is open.

5. The method of claim 4, where the amount of time the fuel injector is open is based on a voltage of the fuel injector.

6. The method of claim 4, where the one or more fuel injector pulse width values are adjusted in response to the amount of time the fuel injector is open.

7. A vehicle system, comprising:
an engine including a fuel injector; and
a controller with computer readable instructions stored on non-transitory memory that when executed cause the controller to:
adjust one or more fuel pulse width values stored in an indexing array without adjusting a fuel injector relationship data array, the fuel injector relationship data array based on a pressure based fuel injector balancing procedure, and apply the indexing array with the one or more adjusted fuel pulse width values to a table or function stored in controller memory to index the table or function responsive to an opening time of the fuel injector, where the table or function stores a relationship of a mass of fuel injected via the fuel injector as a function of fuel injector pulse width, and injecting fuel to the engine via the fuel injector responsive to the one or more adjusted fuel pulse width values.

8. The system of claim 7, further comprising additional instructions to open the fuel injector and monitor the opening time of the fuel injector.

9. The system of claim 7, further comprising additional instructions to perform the pressure based fuel injector balancing procedure, wherein the pressure based fuel injector balancing procedure includes deactivating a fuel injection pump and injecting fuel to the engine while the fuel injection pump is deactivated.

10. The system of claim 9, further comprising additional instructions to adjust one or more values in the fuel injector relationship data array based on the pressure based fuel injector balancing procedure and apply the adjusted one or more values in the fuel injector relationship data array to the table or function that stores the relationship of the mass of fuel injected via the fuel injector as the function of fuel injector pulse width.

11. The system of claim 9, where the fuel injector pump is deactivated while engine load is less than a threshold engine load.

12. The system of claim 7, further comprising additional instructions that when executed by the controller cause the controller to: adjust values in the fuel injector relationship data array and apply the adjusted values in the fuel injector relationship data array to the table or function that stores the relationship of the mass of fuel injected via the fuel injector in response to performing the pressure based fuel injector balancing procedure.

13. The system of claim 12, where the pressure based fuel injector balancing procedure includes estimating an amount of fuel injected via the fuel injector based on a drop in pressure of fuel in a fuel rail.

14. A method for operating a fuel injector, comprising:
performing a pressure based fuel injector balancing procedure, adjusting values in a fuel injector relationship data array, and applying the adjusted values of the fuel injector relationship data array to a table or function that stores a relationship of a mass of fuel injected via a fuel injector as a function of fuel injector pulse widths in controller memory;
commanding the fuel injector to open from a closed position with a commanded fuel injection pulse width after performing the pressure based fuel injector balancing procedure via a controller;
responsive to the commanded fuel injection pulse width, operating the fuel injector with an actual fuel injection pulse width after performing the pressure based fuel injector balancing procedure; and
adjusting one or more fuel injector pulse width values stored in an indexing array without adjusting a fuel injector relationship data array, where the indexing array with the one or more adjusted fuel injector pulse width values is applied to the table or the function responsive to operation of the fuel injector after performing the pressure based fuel injector balancing procedure to index the table or the function.

15. The method of claim 14, where the pressure based fuel injector balancing procedure includes deactivating a fuel pump.

16. The method of claim 15, where the pressure based fuel injector balancing procedure includes injecting fuel to a cylinder.

17. The method of claim 16, where the pressure based fuel injector balancing procedure includes estimating an amount of fuel injected via a pressure drop in a fuel rail.

18. The method of claim 14, further comprising determining an amount of time the fuel injector is open after performing the pressure based fuel injector balancing procedure.

* * * * *